US010665015B2

(12) United States Patent
Dhua et al.

(10) Patent No.: US 10,665,015 B2
(45) Date of Patent: *May 26, 2020

(54) CREATING MULTI-DIMENSIONAL OBJECT REPRESENTATIONS

(71) Applicant: A9.com, Inc., Palo Alto, CA (US)

(72) Inventors: Arnab Sanat Kumar Dhua, Mountain View, CA (US); Himanshu Arora, San Jose, CA (US); Radek Grzeszczuk, Menlo Park, CA (US)

(73) Assignee: A9.COM, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/573,157

(22) Filed: Sep. 17, 2019

(65) Prior Publication Data
US 2020/0013219 A1    Jan. 9, 2020

Related U.S. Application Data

(63) Continuation of application No. 16/411,642, filed on May 14, 2019, now Pat. No. 10,453,254, which is a (Continued)

(51) Int. Cl.
*G06T 17/20* (2006.01)
*G06T 15/20* (2011.01)
(Continued)

(52) U.S. Cl.
CPC .............. *G06T 17/205* (2013.01); *G06T 7/13* (2017.01); *G06T 7/136* (2017.01); *G06T 7/194* (2017.01);
(Continued)

(58) Field of Classification Search
CPC ......... G06T 17/205; G06T 7/194; G06T 7/13; G06T 7/136; G06T 19/006; G06T 15/20;
(Continued)

(56) References Cited

U.S. PATENT DOCUMENTS 5,850,352 A    12/1998  Moezzi et al.
10,347,045 B1    7/2019  Dhua et al.
(Continued)

OTHER PUBLICATIONS

Notice of Allowance issued in co-related U.S. Appl. No. 15/824,697 dated Feb. 25, 2019.
(Continued)

*Primary Examiner* — Tapas Mazumder
(74) *Attorney, Agent, or Firm* — Hogan Lovells US LLP

(57) ABSTRACT

Objects can be rendered in three-dimensions and viewed and manipulated in an augmented reality environment. Background images are subtracted from object images from multiple viewpoints to provide baseline representations of the object. Morphological operations can be used to remove errors caused by misalignment of an object image and background image. Using two different contrast thresholds, pixels can be identified that can be said at two different confidence levels to be object pixels. An edge detection algorithm can be used to determine object contours. Low confidence pixels can be associated with the object if they can be connected to high confidence pixels without crossing an object contour. Segmentation masks can be created from high confidence pixels and properly associated low confidence pixels. Segmentation masks can be used to create a three-dimensional representation of the object.

20 Claims, 17 Drawing Sheets

Related U.S. Application Data continuation of application No. 15/824,697, filed on Nov. 28, 2017, now Pat. No. 10,347,045.

(60) Provisional application No. 62/566,039, filed on Sep. 29, 2017.

(51) Int. Cl.
*G06T 7/136* (2017.01)
*G06T 7/194* (2017.01)
*G06T 7/13* (2017.01)
*G06T 19/00* (2011.01)

(52) U.S. Cl.
CPC ............ *G06T 15/20* (2013.01); *G06T 19/006* (2013.01); *G06T 2207/10028* (2013.01); *G06T 2207/20224* (2013.01); *G06T 2210/21* (2013.01)

(58) Field of Classification Search
CPC . G06T 2207/10028; G06T 2207/20224; G06T 2210/21
See application file for complete search history.

(56) References Cited

U.S. PATENT DOCUMENTS

| | | | | |
|---|---|---|---|---|
| 2003/0098864 | A1* | 5/2003 | Ohno | A63F 13/10 345/421 |
| 2007/0133865 | A1* | 6/2007 | Lee | G06K 9/20 382/154 |
| 2009/0244309 | A1* | 10/2009 | Maison | G06K 9/00369 348/222.1 |
| 2009/0303329 | A1* | 12/2009 | Morisaki | H04N 7/183 348/159 |
| 2015/0334398 | A1 | 11/2015 | Socek et al. | |

OTHER PUBLICATIONS

Notice of Allowance issued in co-related U.S. Appl. No. 16/411,642 dated Jun. 19, 2019.

* cited by examiner

CREATING MULTI-DIMENSIONAL OBJECT REPRESENTATIONS

CROSS-REFERENCE TO RELATED APPLICATIONS

This application is a continuation of allowed U.S. patent application Ser. No. 16/411,642, filed May 14, 2019, titled "CREATING MULTI-DIMENSIONAL OBJECT REPRESENTATIONS", which is a continuation of registered U.S. patent application Ser. No. 15/824,697, filed Nov. 28, 2017, titled "CREATING MULTI-DIMENSIONAL OBJECT REPRESENTATIONS" (now U.S. Pat. No. 10,247,045, issued Jul. 9, 2019), which claims priority to, and the benefit of, U.S. Provisional Patent Application No. 62/566,039, filed Sep. 29, 2017, titled "SEGMENTATION AND ITERATIVE REFINEMENT FOR CREATING MULTI-DIMENSIONAL OBJECT REPRESENTATIONS", the entirety of which is incorporated by reference herein.

BACKGROUND

Users are increasingly purchasing items over the Internet. Accordingly, when a customer receives an item, it may be the first time he or she has viewed the item in person. The item may not look the same way the customer envisioned based on photographs viewed online. For example, a customer may order a lamp to place on an end table, but when the ordered lamp is physically placed on the table, the customer might not be pleased with its size or style, particularly relative to other items in the room. It may be beneficial to view the lamp on the end table in an augmented reality context before ordering it. Augmented reality implementations, however, are only effective if the object in question can be properly rendered in three dimensions. If the scale is off or the object is not rendered accurately from certain angles, then the customer cannot get a true sense of how the object will look in her home. When a user has to guess how a physical object will look, she will often end up with an item that does not fit her needs properly.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to creating, displaying, and manipulating representations of objects. For example, a multi-camera array can be arranged about a surface to first capture images of the background from different viewpoints. An object can then be placed on the surface and another set of images captured. In embodiments, the surface can be a rotatable platen, such that the platen can rotate to let the stationary camera array capture different viewpoints of the object. The background images can be subtracted from the object images and various artifacts can be removed from the difference image.

Using different contrast thresholds, pixels associated with the object can be indicated with varying degrees of confidence. Segmentation masks highlighting the object pixels can then be created for the object images. The segmentation masks can be used to determine a three-dimensional object mesh structure representing the object. In embodiments, the object mesh structure can be packaged with the object images and segmentation masks and sent to a client device. From the display of the client device, the object mesh structure can be manipulated to be viewed from different orientations. The appropriate object image can be overlaid on the object mesh structure so that when a given viewpoint of the object mesh structure is requested, the object image for that viewpoint is presented to a user.

Various other such functions can be used as well within the scope of the various embodiments as would be apparent to one of ordinary skill in the art in light of the teachings and suggestions contained herein.

Figure 1A:
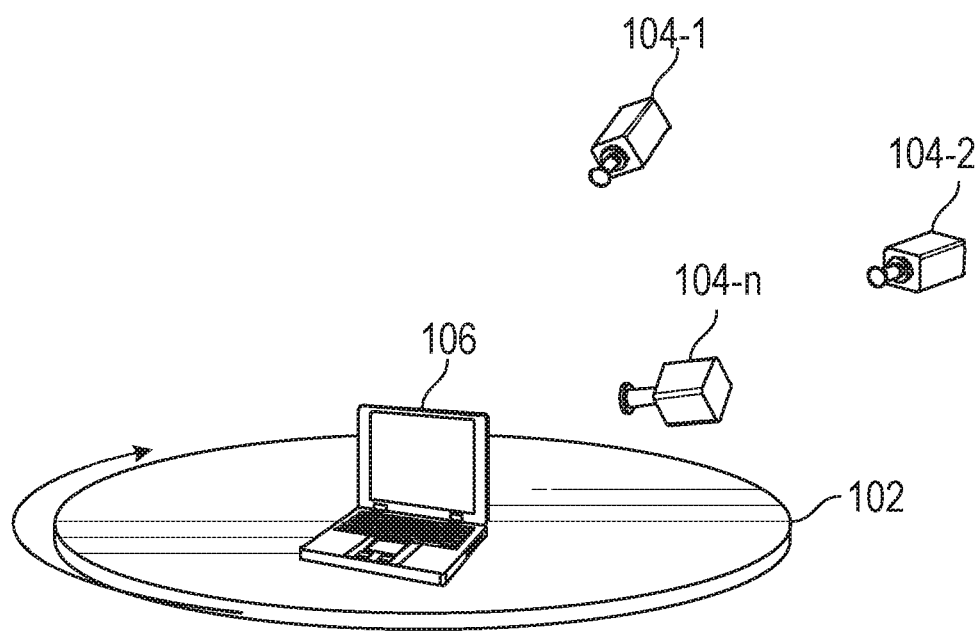
FIGS. 1A-B illustrate an example image capture system according to various embodiments.

FIG. 1A illustrates an example image capture array 100 in which aspects of the various embodiments can be implemented. In embodiments, a number of cameras 104-1, 104-2, . . . 104-$n$ or other image capture devices are positioned about a platen 102. The image capture devices can include RGB cameras, infrared sensors, and/or other devices. The illustrative cameras 104-1, 104-2, . . . 104-$n$ capture images of the platen 102 and background without an object present, such that there is a background image associated with each viewpoint. An object 106 to be rendered is positioned on the platen 102. The cameras 104-1, 104-2, ... 104-n capture images of the object 106, the platen rotates, and additional images are captured from different viewpoints. The number of rotations and the number of cameras 104-1, 104-2, ... 104-n can vary. For example, in embodiments, 19 cameras and 72 rotations can be used. This results in 19 background images, one for each camera, and 1,368 object images, one per camera per platen position. As noted, however, these numbers can be varied.

Figure 1B:
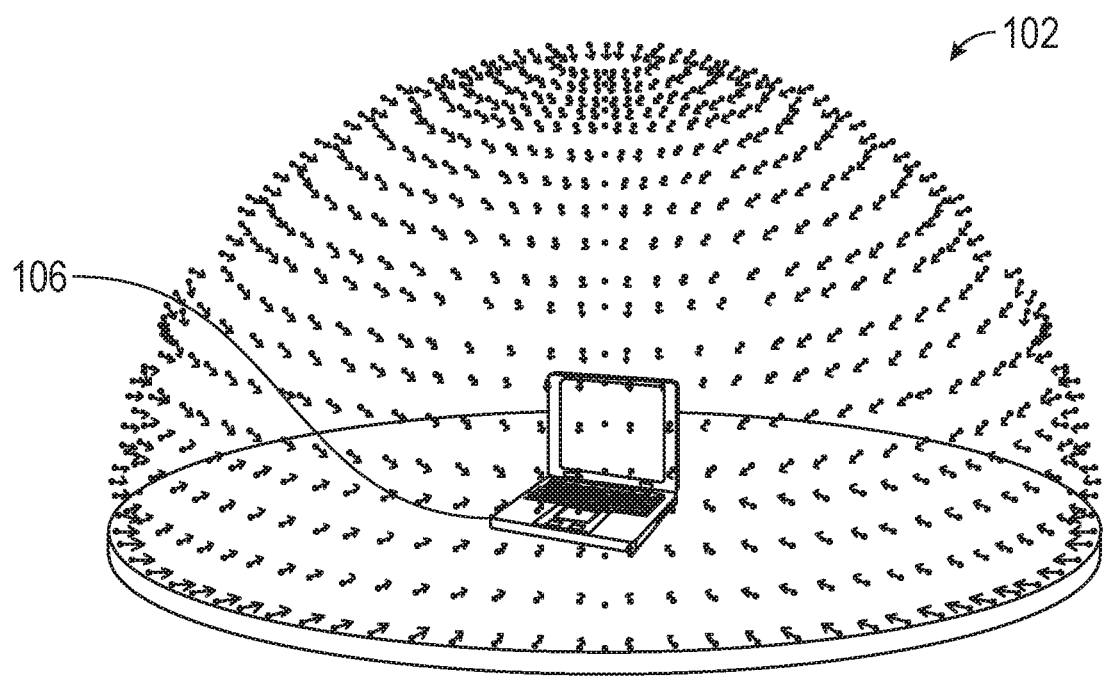

As illustrated in FIG. 1B, this results in capturing object images from a number of different viewpoints in a hemisphere 102 about the object 106. The "density" of this viewpoint hemisphere 102, or total number of viewpoints contained, depends on the number of image capture devices used and the number of platen positions at which images are captured.

Figure 2:
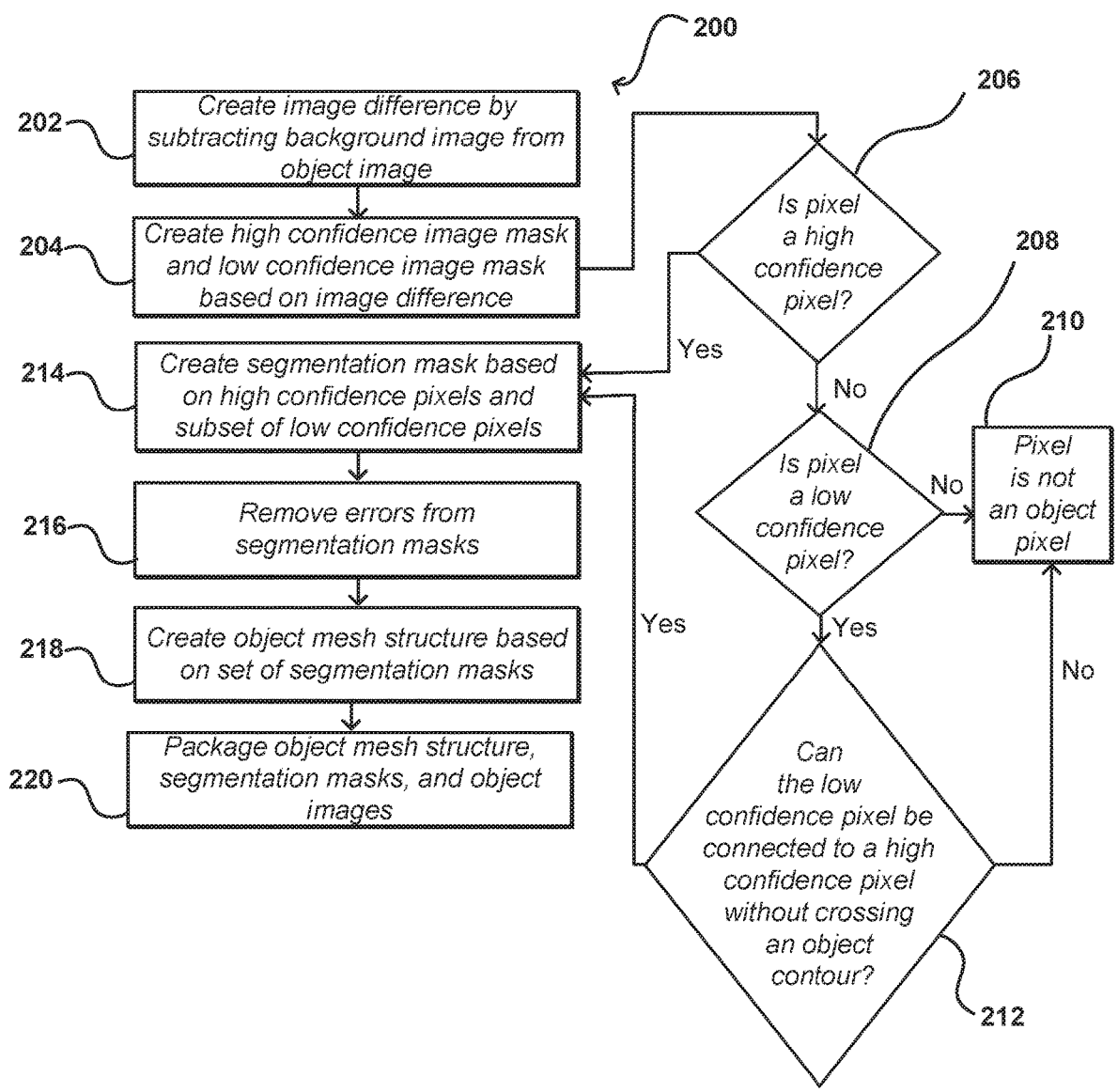
FIG. 2 illustrates an example process for creating multi-dimensional object representations that can be utilized in accordance with various embodiments.

FIG. 2 illustrates an example process 200 that can be implemented according to embodiments. The object images can be paired with background images. Ideally, the only differences between an object image and its corresponding background image will be caused by the presence of the object itself, though as discussed below other artifacts can appear during image processing. An image difference can be created by subtracting a background image from an object image 202. The image difference can be used to create a high confidence mask and low confidence mask 204. As discussed in more detail below, these confidence masks indicate, with a given degree of confidence, how likely it is that a given image pixel is associated with the object. Therefore, pixels indicated in the high confidence mask are indicated to be associated with the object with a greater degree of confidence than pixels indicated in the low confidence mask. Therefore, a determination is made if a pixel is a high confidence pixel 206. If it is, it is used to highlight the object in a segmentation mask 214. If it is not, it is determined whether the pixel is a low confidence pixel 208. If a pixel is not a low confidence pixel, then it is determined not to be an object pixel 210. In other words, if a pixel does not even meet the lower confidence threshold for being an object pixel that is set in the low confidence image mask, then a determination is made that the pixel is not associated with the object 210.

If a pixel is determined to be a low confidence pixel, however, then it may still be associated with the object. A determination is made whether a low confidence pixel can connected to a high confidence pixel without crossing an object contour 212. If it cannot be, then the low confidence pixel is determined not to be associated with the object 210. If the low confidence pixel can be connected to a high confidence pixel without crossing an image contour 212, however, then it is associated with the object.

Based on the high confidence pixels and the subset of low confidence pixels described above, a segmentation mask is created for each object image 214. This results in a set of segmentation masks indicating the object from multiple viewpoints because the object images portray the objects from multiple viewpoints. These segmentation masks may include errors. In other words, they may highlight non-object pixels as object pixels. Various errors, including those caused by transparent object portions, object reflections, and misalignment of the background and object images, can occur. Embodiments include the removal of these errors 216 as discussed in more detail below.

An object mesh structure can then be created based on the set of segmentation masks 218. The object mesh structure is a three-dimensional structure that includes information from all of the two-dimensional segmentation masks, which means it includes information from all object images. In embodiments, the object mesh structure is created by categorizing space in the segmentation masks as filled or unfilled. Filled space can include the high confidence pixels and the connected low confidence pixels as described above. The remaining space in each two dimensional segmentation mask can be considered unfilled. The unfilled space from each segmentation mask can be used to carve away at a three-dimensional object environment. The object environment can be thought of as the three-dimensional space in which the object sits. Segmentation masks are used to remove unfilled space from the object environment. In other words, if a segmentation mask shows that the object does not occupy a certain space, then that space is considered not to include the object in either two or three dimensions. Put another way, if the object had occupied a portion of the object environment in three dimensions, then the two-dimensional object mask, which is effectively a projection of the objection into two dimensions, would have reflected that. Accordingly, the unfilled space across all segmentation masks can be removed, resulting in a three-dimensional object mesh structure. Because the object mesh structure takes into account information provided by all segmentation masks, then errors that appear in only some segmentation masks are averaged out. In other words, the effect of any one error can be mitigated by the lack of that error in segmentation masks portraying other viewpoints.

The object mesh structure can then be packaged with the object images and segmentation masks 220. This package can be sent to a client device in embodiments. On a display, a user can manipulate the object mesh structure, such as by rotating it or translating it across a surface. For example, the laptop described above can have an associated object mesh structure. A user can rotate the laptop to view it from different angles. Because the various object images are included in the package sent to the client device, the appropriate object image can overlay the object mesh structure. This means that when a user rotates the laptop to look at the keyboard, the user views the actual object image captured providing an overhead view of the keyboard. If the user wants to view the side of the laptop, for example to see which ports it has and how they are arranged, then the user can rotate the object mesh structure to one side. In embodiments, the object image displayed to the user changes as the object mesh structure is rotated, so that the user views only actual object images overlaying the object mesh structure. When the user completes the rotation to the side view, the display shows the object image captured from that side view.

Figure 3A:
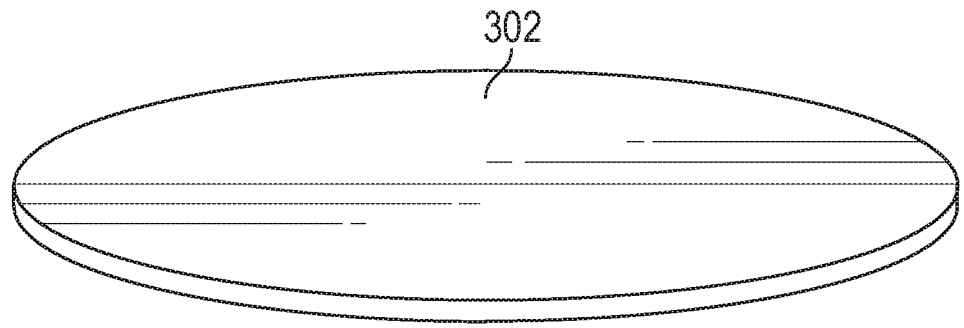
FIGS. 3A-D illustrate example images that can be utilized in accordance with various embodiments.
Figure 3B:
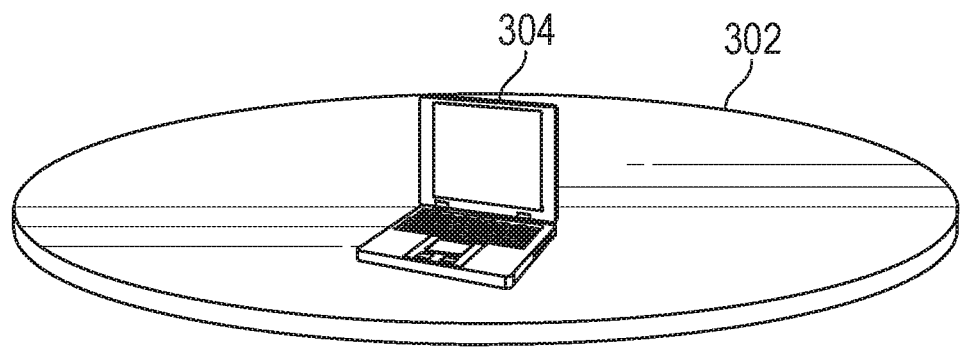
Figure 3C:
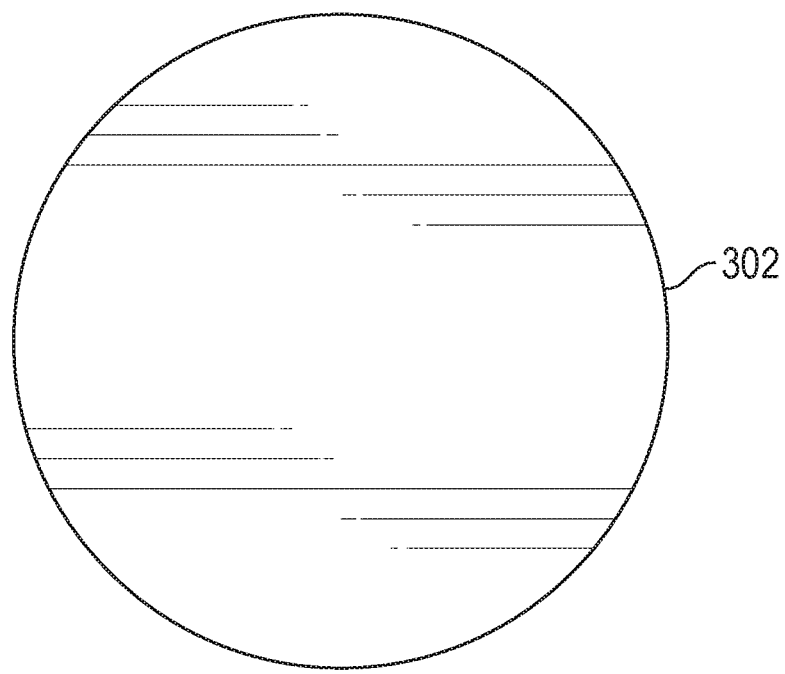
Figure 3D:
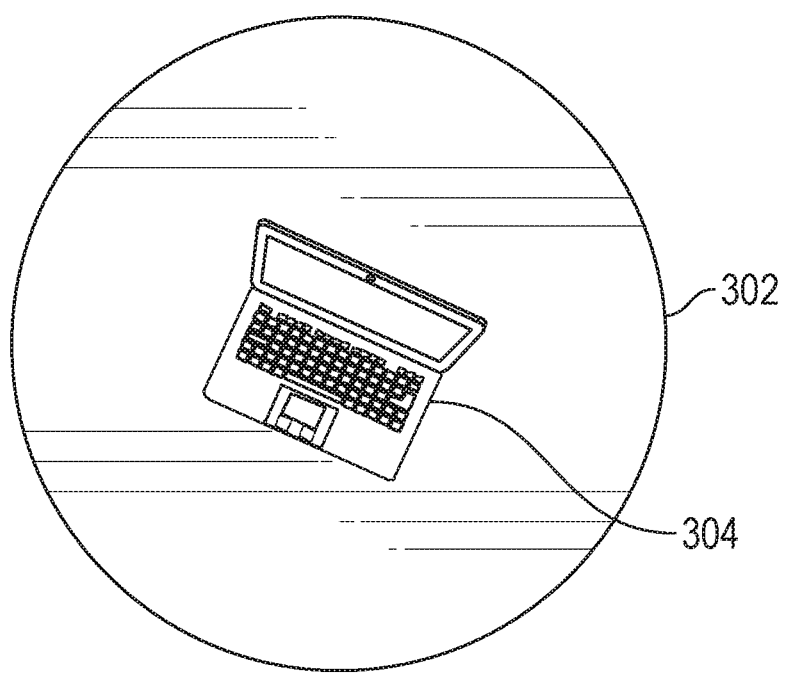

FIGS. 3A-D illustrate example pairings of background images with object images. As seen in FIG. 3A, a background image is captured without an object present. FIG. 3B illustrates the image taken again with the platen 302 in the same position, but with a laptop 304, as an example, placed on the platen 302. FIG. 3C shows a background image with an overhead view of the platen 302. The camera that captures this background image can then capture an object image with the laptop 304 on the platen as shown in FIG. 3D.

In embodiments, the background images, such as those in FIGS. 3A, C are taken before an object is placed on the platen 302. In embodiments, all cameras are stationary. That is, only the object to be rendered moves during the image capture process. Accordingly, a set of background images is captured at an initial platen position, one background image for each camera. Then, a set of object images, such as those shown in FIGS. 3B, D are captured at the initial platen position. When the platen 302 rotates to a second platen position, a second set of object images is captured. These object images, and those taken at subsequent platen positions, do not require a new set of background images. Because, in embodiments, the cameras do not move, the background images captured initially can be associated with their respective cameras. This association allows each object image to be associated with the background image tied to the camera that captured the object image. Therefore, for example, multiple images can be captured from a single camera during multiple respective platen positions. For each of these object images, the background image will be the same, namely the image captured by that camera before an object was placed on the platen. Therefore, the image difference that is created for each of these object images relies on subtracting that particular background image.

Figure 4:
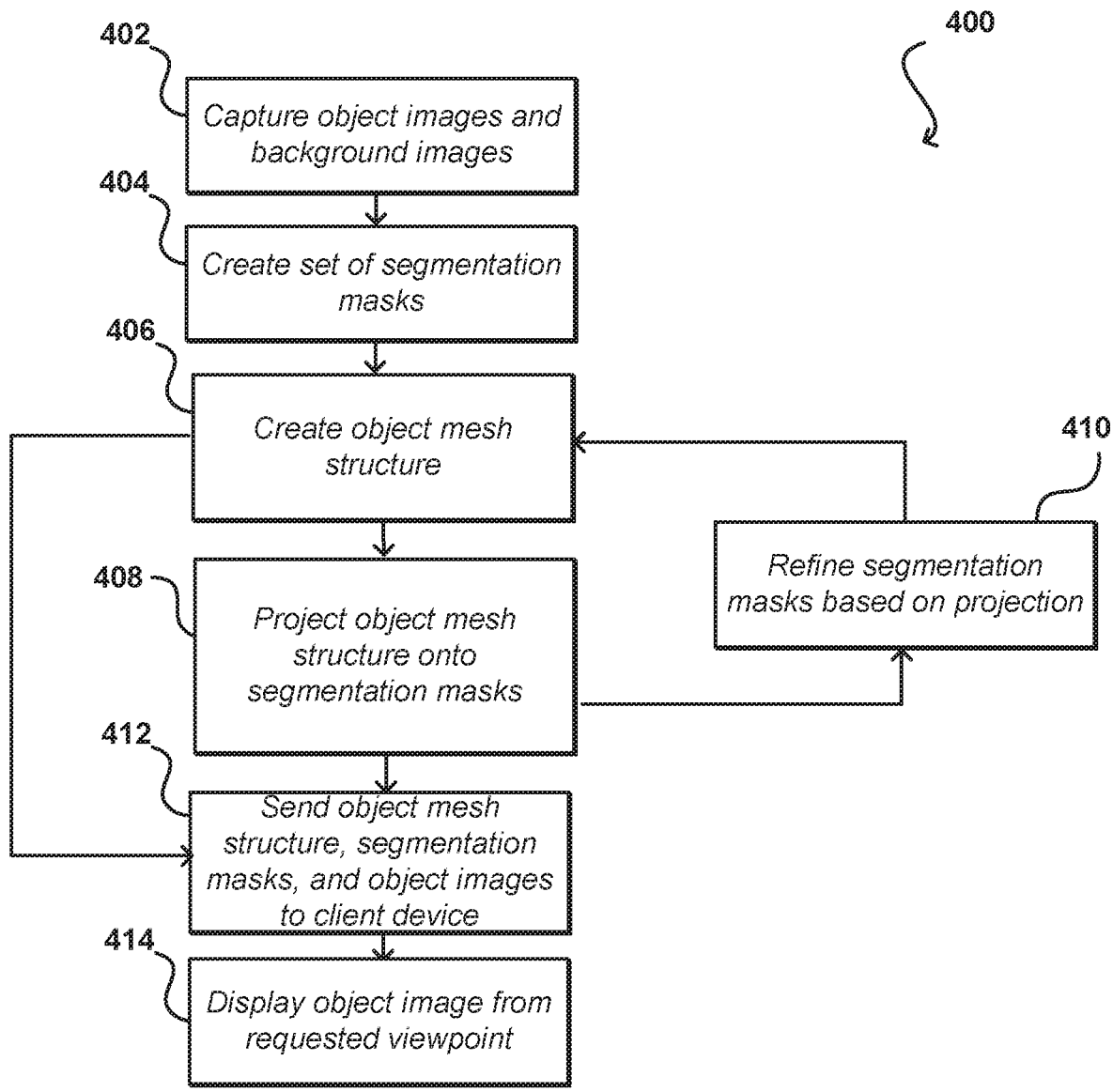
FIG. 4 illustrates an example process for creating multi-dimensional object representations that can be utilized in accordance with various embodiments

FIG. 4 illustrates an example process 400 that can be implemented according to various embodiments. As discussed above, the object images and background images can be captured 402 for a plurality of viewpoints, and segmentation masks can be created 404. An object mesh structure can be created 406 based on the segmentation masks. In embodiments, the object mesh structure is then used to refine the segmentation masks. The object mesh structure captures information across all segmentation masks. Some of these segmentation masks may include errors that appear due to the viewpoint at which their respective images were captures. For example, an error caused by a transparent portion of an object may appear in only 5% of segmentation masks, while that transparent portion may be properly segmented in the other 95% of segmentation masks. One way to address this issue is to project the object mesh structure onto the segmentation masks 408. The object mesh structure from a viewpoint is projected onto the segmentation mask of the same viewpoint. The segmentation mask can then be refined based on the projection 410. This creates another set of segmentation masks, which now include information from more than one object image. The mesh structure can then be recreated 406 using the refined segmentation masks. In embodiments, this iterative refinement can continue multiple times in the 406-408-410 loop. In embodiments, the loop can occur once or not at all. For example, after creating the object mesh structure 406, the object mesh structure, segmentation masks, and object images can be sent to a client device 412 without projection 408 or refinement 410. In embodiments, the iterative loop continues until convergence. That is, iterations can continue until the object mesh structure created at the nth refinement matches the object mesh structure created at the (n−1)th refinement. Then, the object mesh structure, segmentation masks, and object images can be sent to a client device 412, where the appropriate object image can be displayed based on the viewpoint requested 414.

Figure 5A:
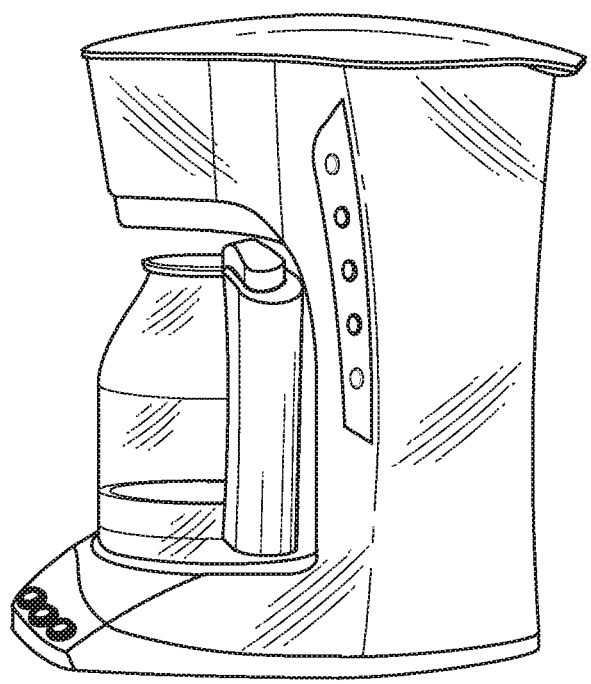
FIGS. 5A-B illustrate an example image and image mask that can be utilized in accordance with various embodiments.
Figure 5B:
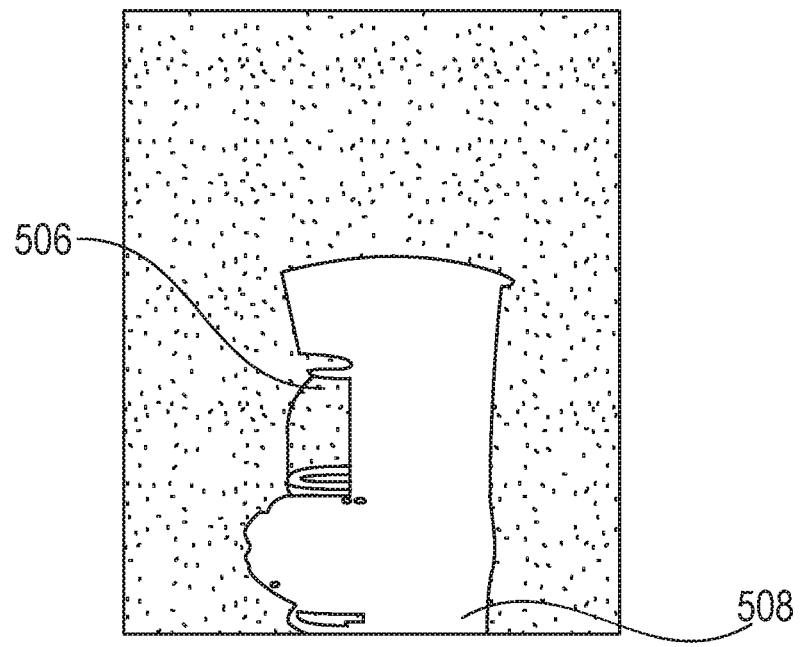

FIGS. 5A-B illustrate an object image and errors that can occur when creating a segmentation mask. FIG. 5A illustrates an object image 502 depicting a coffeemaker. The coffeemaker includes a transparent portion, which can be difficult to image. Likewise, objects have reflections, which create problems for imaging. FIG. 5B illustrates an example high confidence image mask 504 without an edge connectivity analysis to connect select low confidence regions. For example, a transparency error 506 can be seen in the high confidence image mask 504. If all segmentation masks across all object images included this error, then a three-dimensional rendering of the coffeemaker would not include the coffeepot, which appears as if it is part of the background. As discussed more below, however, transparency errors typically only show up in a subset of all segmentation masks. Therefore, these errors can be averaged out in the object mesh structure, which includes information from all segmentation masks across all of the object images.

The high confidence image mask 504 in FIG. 5B also shows a reflection error 508. When a portion of the object is reflected onto the platen, it can be misinterpreted as part of the object when the high confidence image mask 504 is formed. This is because the reflection adds pixels to the object image that were not present in the background image. As discussed more in the context of FIGS. 11A-B, the reflection portion can be removed from the three-dimensional object mesh structure. Another error that can be present in a segmentation mask is a misalignment error, which is discussed below.

Figure 6:
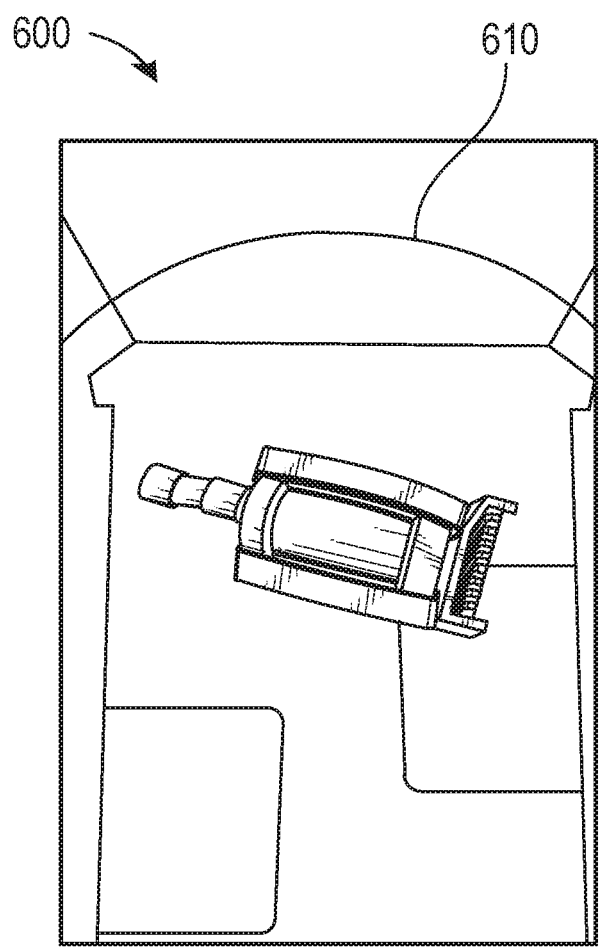
FIG. 6 illustrates an example object image that can be utilized in accordance with various embodiments.

FIG. 6 depicts an object image 600. The platen edge 610 is visible in the object image 600. As discussed in reference to FIGS. 3A-D, the object image 600 will have a corresponding background image. Subtracting the background image from the object image creates an image difference. The image difference can be used to highlight, with different degrees of confidence, pixels that are present in the object image but not present in the background image. The greater the contrast between a pixel and the background, the greater the confidence level with which it can be designated an object pixel. Accordingly, a contrast threshold can be set with all pixels exceeding the threshold being indicated in a confidence image mask. A first higher threshold can indicate those pixels that can be said with a high degree of confidence to belong to the object. A second threshold, lower than the first threshold, can indicate those pixels that can be said with a lower degree of confidence to belong to the object.

Figure 7A:
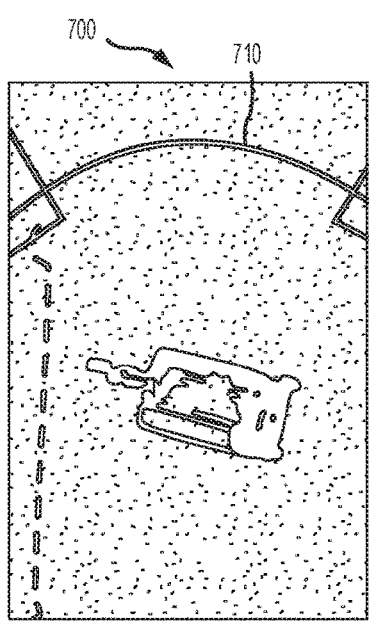
FIGS. 7A-C illustrate example image masks that can be utilized in accordance with various embodiments.

FIG. 7A illustrates a misalignment error 710. Any article present in both images should be absent from the segmentation mask because ideally such an article would be in the exact same location in both images. For example, ideally, the platen edge 610 would be removed completely from the image subtraction because the platen in the background image would correspond exactly to the platen in the object image. This may not be the case, however, if the object image 600 and the background image are misaligned. Because slight shifts might occur between capture of the background image and capture of the object image, the difference image may include long curves or edges from the platen or other background structures. The misalignment error 710 in FIG. 7A reflects such an occurrence.

Embodiments include removal of lines caused by misalignment. Morphological operations, such as the morphological open operation or pixel erosion, can be applied to both the high confidence image mask and the low confidence image mask. These operations can remove long edges, or edges above a threshold length, for example using linear and circular structuring elements. It can be determined that edges above the threshold length are due to misalignment errors and not part of the object. These misalignment errors can be removed from the segmentation masks. An erosion step can also be used to remove long lines or misalignment errors 710. Erosion causes pixels to be removed from the image if they are not part of a body of pixels above a threshold size. The misalignment error 710 can be removed by eroding the associated pixels from the image. That is, the pixels associated with misalignment error 710 are eroded because they are not part of a body of pixels above a threshold size.

Figure 7B:
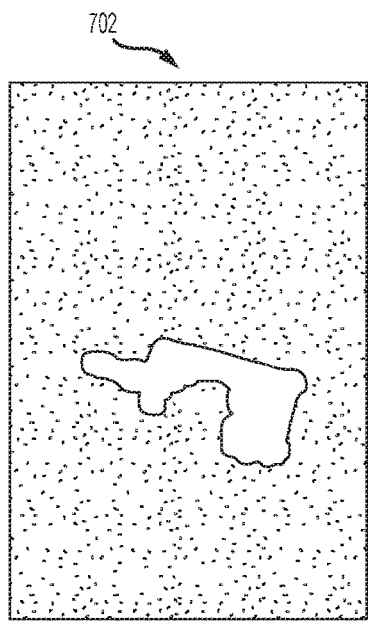
Figure 7C:
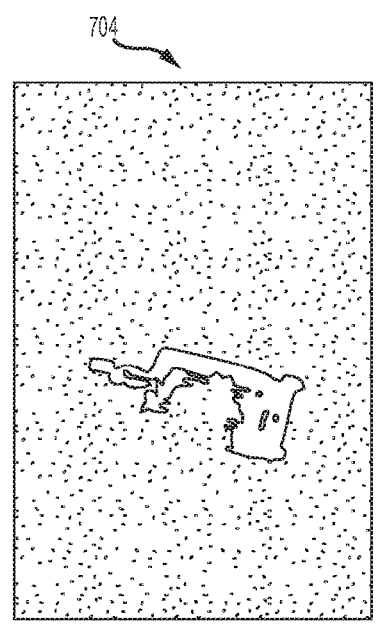

The high confidence image mask and low confidence image mask can be cleaned before additional processing. For example, FIG. 7A illustrates a high confidence image mask 700. The techniques discussed herein can be applied to low confidence image masks as well, though they are discussed with respect to the high confidence image mask 700 as an example. The high confidence image mask 700 includes artifacts discussed above, such as misalignment error 710. These errors are removed in FIG. 7B, for example using techniques discussed herein. In addition, the high confidence masks are dilated. The dilated pixel image 702 in FIG. 7B is then masked with the original pixels of the high confidence image mask 700. This creates a "clean" version of the high confidence image mask 704 in FIG. 7C. The dilation and masking preserves the object boundary details, which are affected by the morphological operations used to remove the misalignment and other errors that appear the high confidence image mask 700. In embodiments, the high confidence image mask and low confidence image mask are both processed in this manner.

Figure 8A:
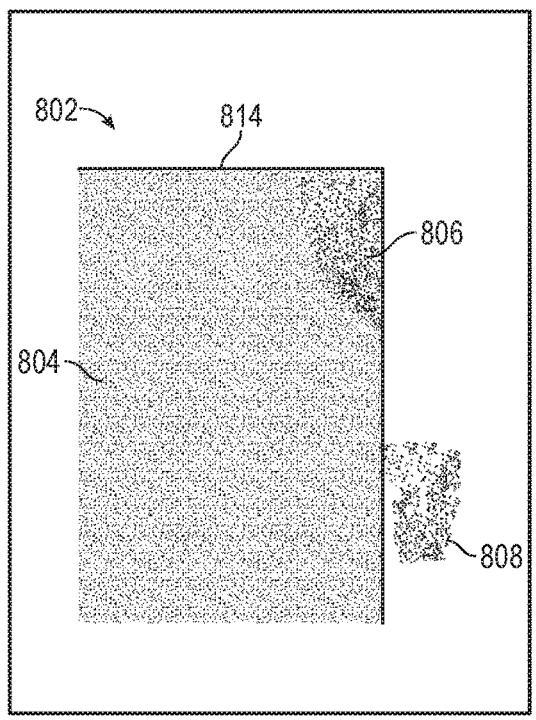
FIGS. 8A-B illustrate an example step for creating a segmentation mask that can be utilized in accordance with various embodiments.
Figure 8B:
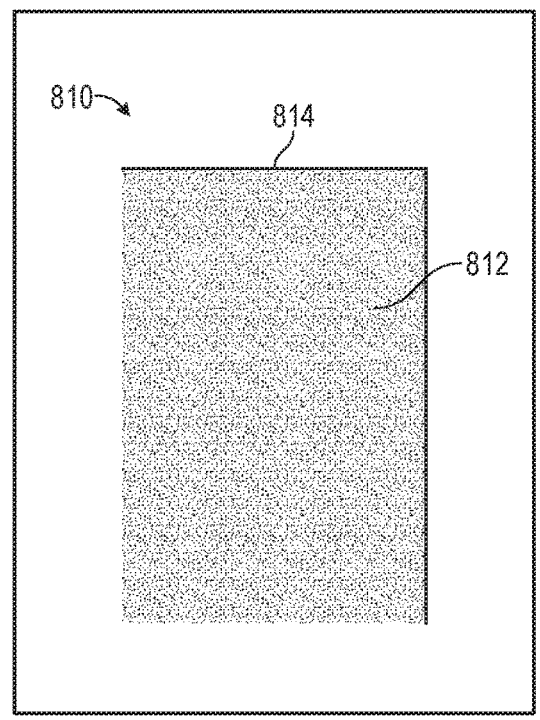

FIGS. 8A-B illustrate a localized example of a low confidence region being properly integrated with a high confidence region. FIG. 8A depicts an object corner 802. The object contours 814 have been detected. In addition, high confidence pixels 804 have been identified. Two regions with low confidence pixels 806, 808 have also been identified. In embodiments, a distinction is recognized between the low confidence pixels at 806 and the low confidence pixels at 808. In particular, the low confidence pixels at 806 can be connected to high confidence pixels 804 without crossing an object contour 814. The low confidence pixels at 808, however, would have to cross the object contour 814 to connect with the high confidence pixels 804. Accordingly, it is determined that the low confidence pixels at 806 represent object pixels and the low confidence pixels at 808 do not.

FIG. 8B illustrates the result of distinguishing between low confidence pixels that can be associated with the object and those that are not associated with the object. The segmentation mask shows the same object corner 810 after the high confidence pixels and the appropriate low confidence pixels have been combined. The segmentation mask pixels 812 are determined to belong to the object being rendered.

Figure 9:
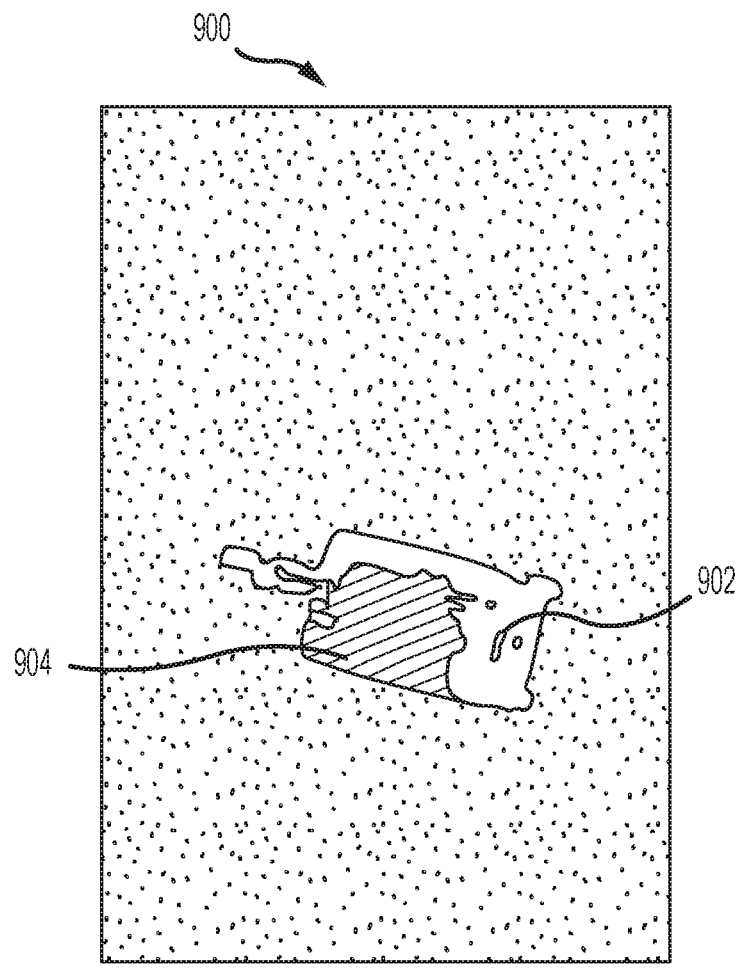
FIG. 9 illustrates an example segmentation mask that can be utilized in accordance with various embodiments.

FIG. 9 provides another example of integrated high confidence and low confidence pixels, this time in a representation of a segmentation mask 900 of an object. It includes pixels that can be said with a high degree of confidence to belong to the object. The high confidence pixels 902 are shown in white in the segmentation mask. Low confidence pixels 904 that were determined to be associated with the object are shown in gray in the segmentation mask 900. As can be seen, the combination of high confidence pixels 902 and select low confidence pixels 904 are integrated to represent the object.

Figures 10A, 10B:
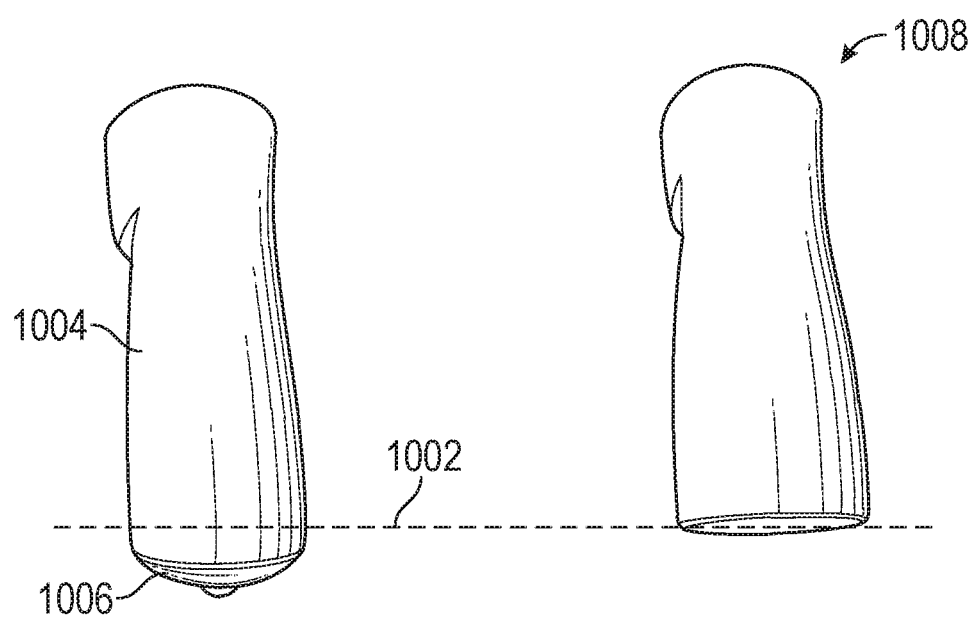
FIGS. 10A-B illustrate an example for correcting reflection errors that can be utilized in accordance with various embodiments.

FIG. 10A shows an example of an object mesh structure. FIG. 10A, however, demonstrates an error that can arise due to reflections of the object during image capture. The reflection portion 1006 is not actually part of the object being rendered. It is shown because the above techniques may categorize pixels reflected onto the platen or other surface as part of the object itself and then render these pixels as part of the object. To correct for reflections, embodiments take into account that the location of the ground plane 1002 is known. As seen in FIG. 10A, a portion of the object mesh structure is located above the ground plane 1004 and a portion is located below 1006. The portion below can be categorized as the reflection portion 1006 of the object mesh structure, and the portion above 1004 can be categorized as representative of the object being rendered.

The reflection portion 1006 can be removed. As shown in FIG. 10B, the object mesh structure 1008 can be rendered without the reflection portion 1006 from FIG. 10A.

Figure 11A:
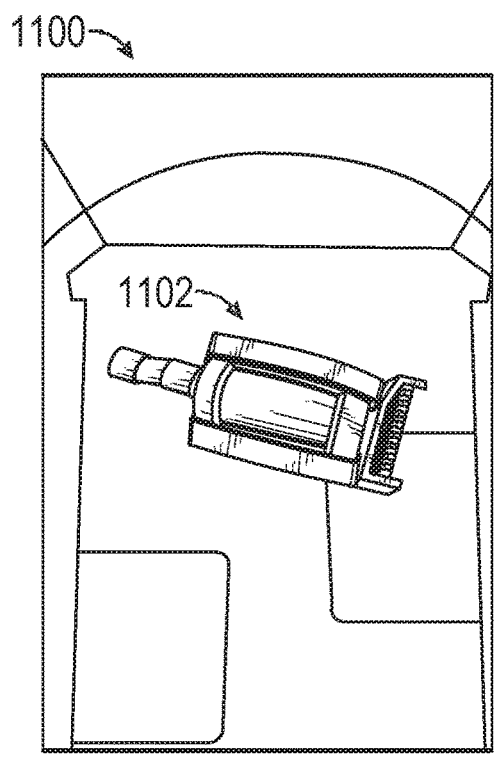
FIGS. 11A-D illustrate an example for determining object contours in accordance with various embodiments.
Figure 11B:
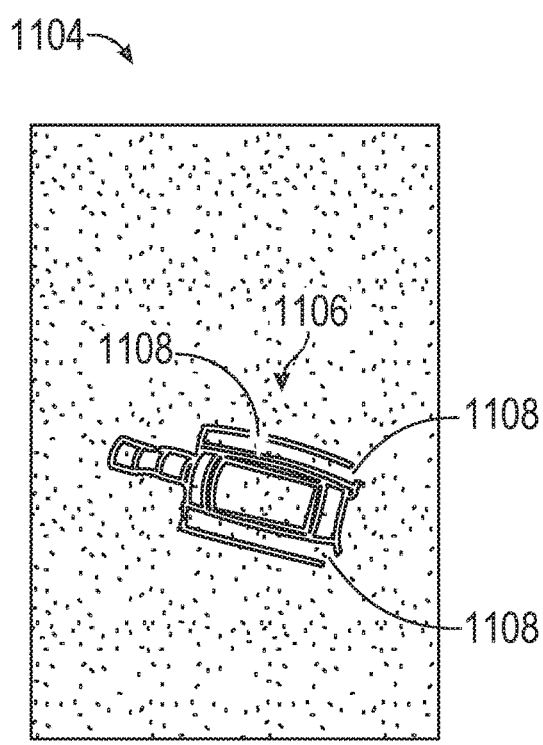
Figure 11C:
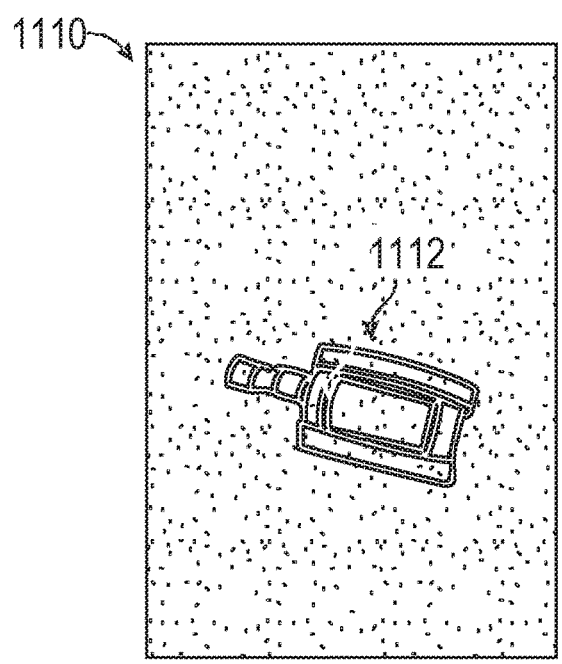
Figure 11D:
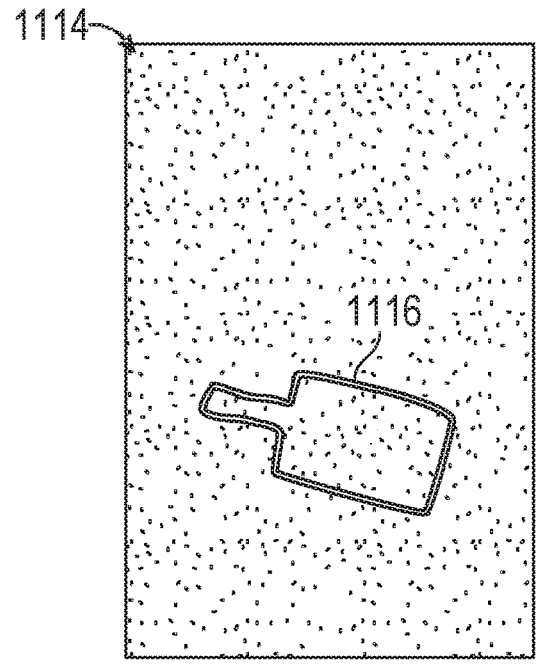

The contour detection described herein can be achieved by using an edge detection algorithm to create an edge map. As illustrated in FIG. 11A, an object image 1100 can be captured portraying an object 1102. FIG. 11B illustrates an example image 1104 in which an edge detection algorithm can be applied to create an edge map 1106. The edge detection algorithm can consider contrast changes in an image that are typically due to the presence of an edge. The edge map 1106 may include gaps 1108, or edge portions that are not detected by the edge detection algorithm. Morphological operations can then be used to close gaps 1108 in the edge map 1106. For example, the "close" morphological operation can be applied to an edge map 1106, using horizontal, vertical, and diagonal lines as structuring elements. This closes the gaps 1108 in the edge map 1106. FIG. 11C illustrates an example image 1110 in which the revised edge map 1112 is complete. That is the gaps 1108 in the earlier edge map 1106 have been removed. Embodiments include determining the object contours for the object, or the outermost edges associated with the object. In embodiments, interior edges are not used for the segmentation masks because each individual segmentation mask represents the two-dimensional space occupied by the object from the viewpoint associate with that particular segmentation mask. Accordingly, interior edges are not considered in certain embodiments. To determine the object contours—the outermost edge—the image 1110 is traversed from the boundaries. The first pixels encountered while traversing the image are considered contour pixels, which, as used herein, refers to the pixels demarking the outer boundary of the object. Applying this process isolates the contour pixels. FIG. 11D illustrates an example image 1114 in which the object contour 1116, made up of the isolated contour pixels, is shown.

Because the object image masks from all viewpoints are used to generate the object structure mask, the object mesh structure includes segmentation information from all viewpoints. The object mesh structure can be thought of as encoding all of the segmentation information and averaging this information out across all the viewpoints. This can be useful because some errors in the segmentation masks may appear only in certain views. For example, errors caused by white spaces or transparent portions of an object may cause errors only from certain viewpoints. Accordingly, the object mesh structure, which considers all segmentation masks, is less impacted by the errors present in any individual viewpoint.

Figure 12A:
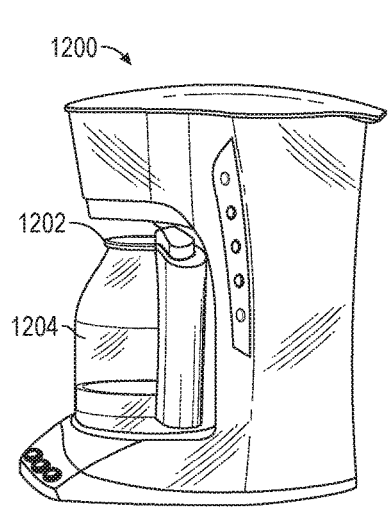
FIGS. 12A-C illustrate refining a segmentation mask in accordance with various embodiments.
Figure 12B:
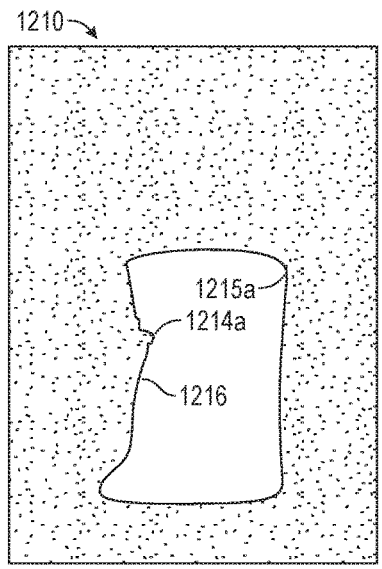
Figure 12C:
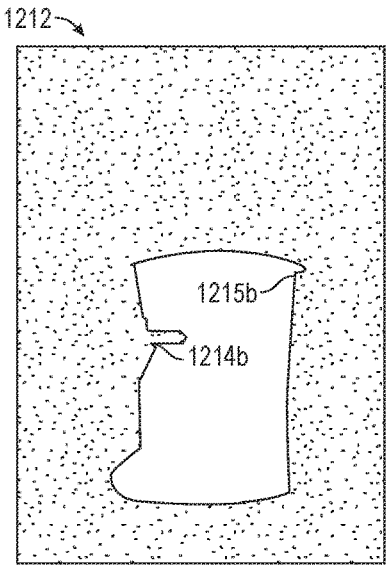

Therefore, the object mesh structure can be used as feedback to refine the input segmentation masks. The object mesh structure from a particular viewpoint can be projected to the image mask for that viewpoint. FIG. 12A shows a coffeemaker 1200 to be rendered. Certain aspects of this object present rendering challenges. For example, the lip 1202 of the carafe and the transparent portion 1204 of the carafe may present difficulties. FIG. 12B shows a segmentation mask 1210. In this example, the transparent portion 1216 of the carafe is properly shown. However, the lip of the carafe 1214*a* and the corner 1215*a* lack the detail that can be seen in the coffeemaker 1200. Projecting the object mesh structure onto the segmentation mask 1210 and refining the segmentation mask 1200 adds additional details, effectively averaging out errors. Therefore, the refined mask 1212 in FIG. 12C shows sharper detail at the carafe lip 1214*b* and the corner 1215*b* than the pre-refined segmentation mask 1210.

Figure 13A:
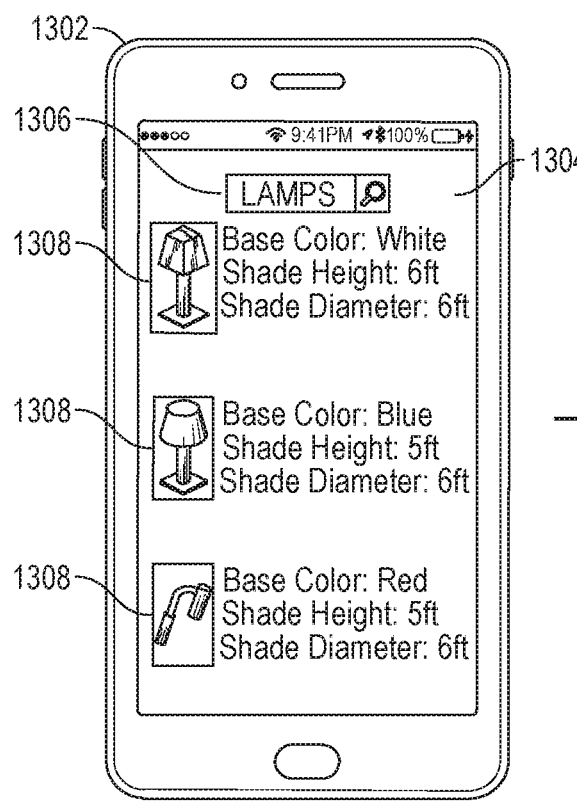
FIGS. 13A-B illustrate an example user interface that can be utilized in accordance with various embodiments.
Figure 13B:
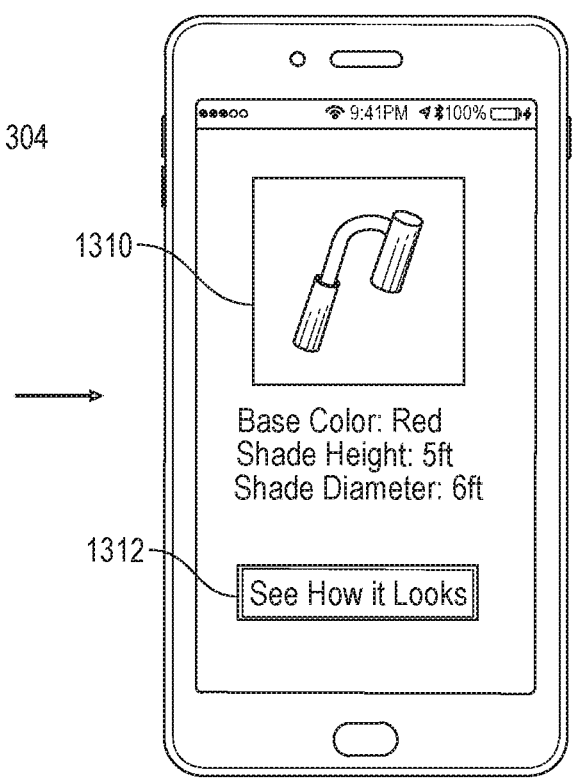

FIGS. 13A-B illustrate an example mobile application 1204 that can be used to implement various embodiments. The application 1304 can run on a mobile device 1302 or other computing system. Embodiments can receive input of search parameters through a search field 1306. For example, the user can search for lamps. Various lamps 1308 can then be presented to the user. FIG. 13B illustrates an example user interface that can be displayed in response to an item selection. The user can be shown a page with additional details about the user's selected lamp 1310. A "See How It Looks" selection 1312 or similar prompt can be presented to a user. When selected, the user can interact with a rendering of the selected lamp 1310.

Figure 14:
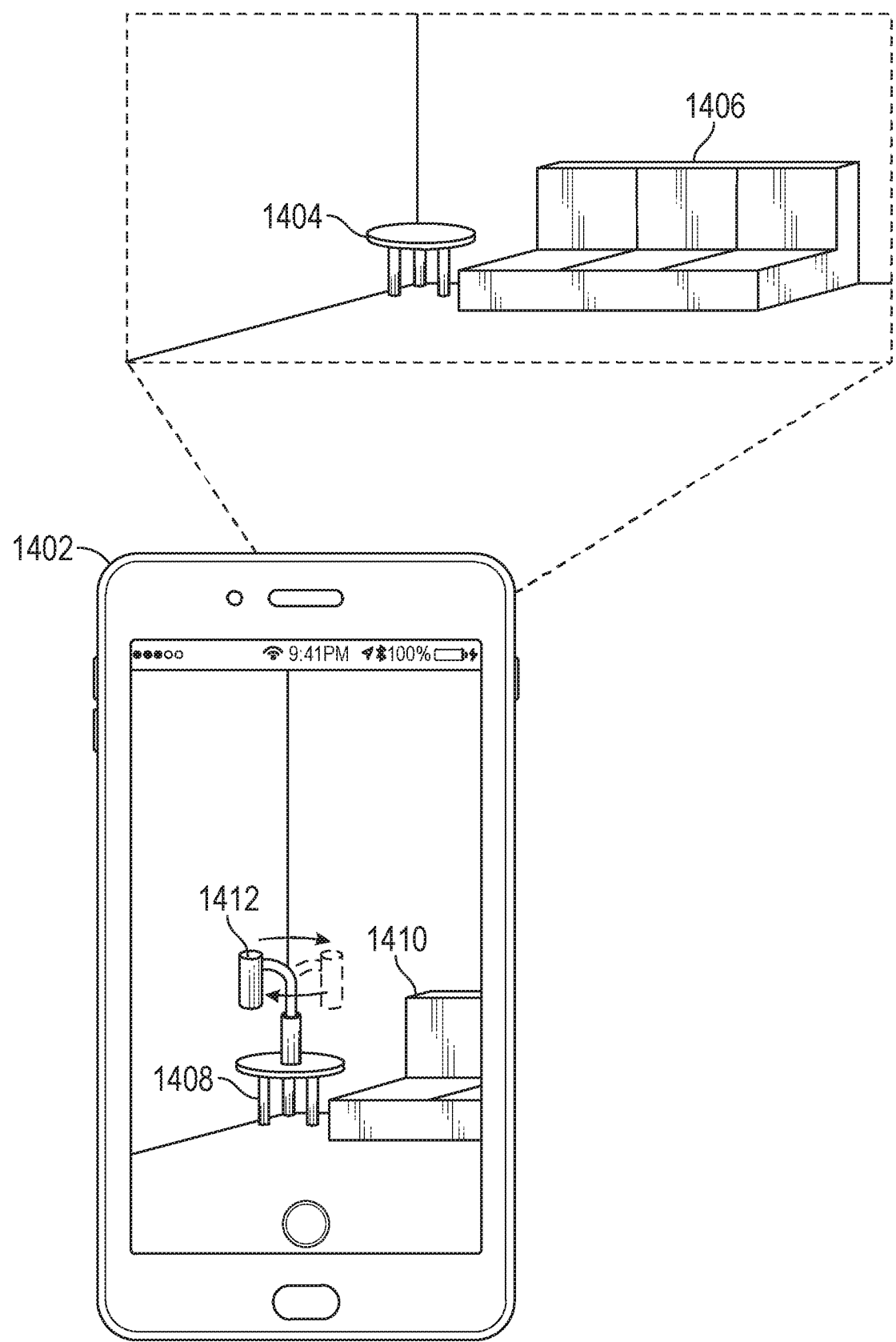
FIG. 14 illustrates an example user interface that can be utilized in accordance with various embodiments.

As illustrated in FIG. 14, one manner in which a user can interact with her selected item is through an augmented reality setting. Continuing the above example, the selected lamp 1310 can be viewed in a user's home so she can get a sense of how the lamp would actually look where she had planned to place it. For example, a user may plan to place the selected lamp 1310 in her living room on an end table 1404 next to her couch 1306. The user can point the camera of her mobile device 1402 at the end table 1404. Through the mobile device's display, the user can view a representation of the lamp 1412 placed on top of the end table 1408. When viewing the representation of the lamp 1412 through her mobile device's display, the user can compare it to the color of the couch 1410 or the height of the end table 1408 to name two examples. The user can also rotate the representation of the lamp 1412 or move it around on the end table. This way, the user can understand how various items would look in her apartment before purchasing them.

Figure 15:
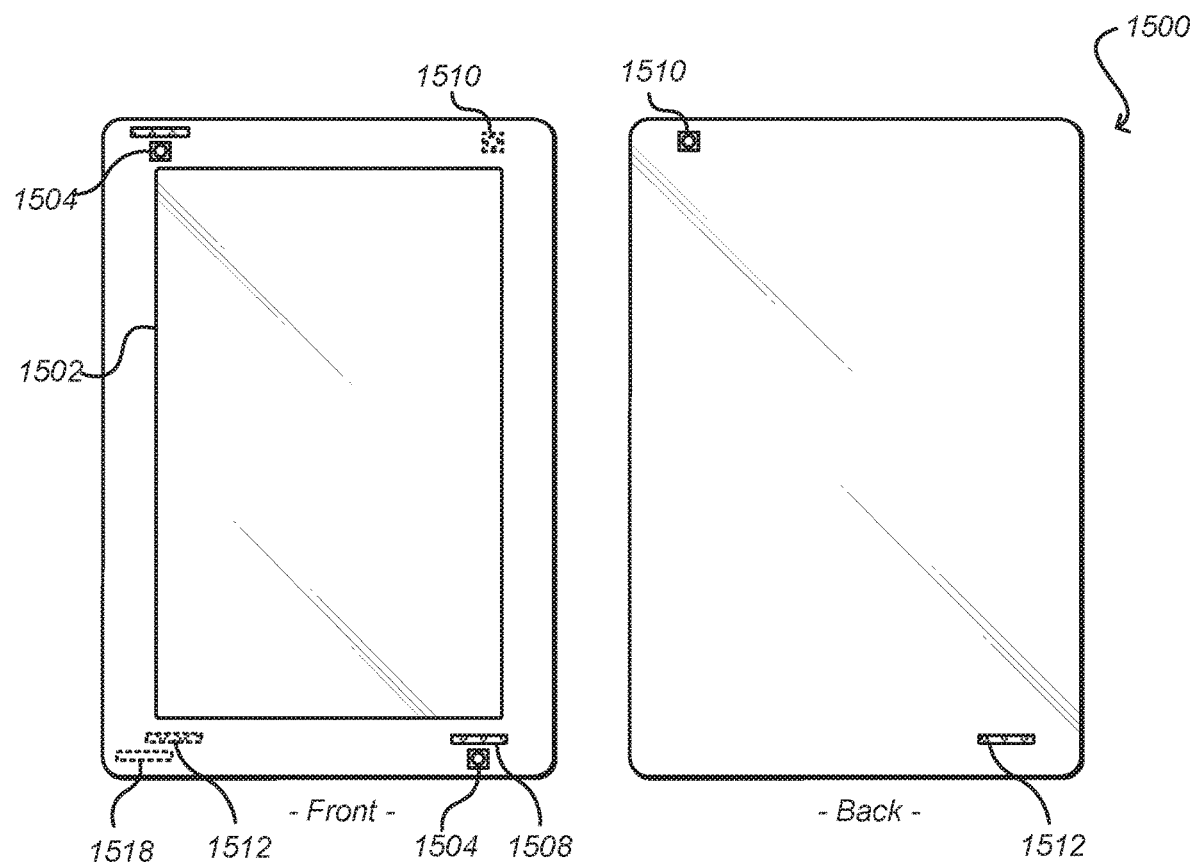
FIGS. 15-16 illustrate example components of a computing device that can be used to implement aspects of various embodiments.
Figure 16:
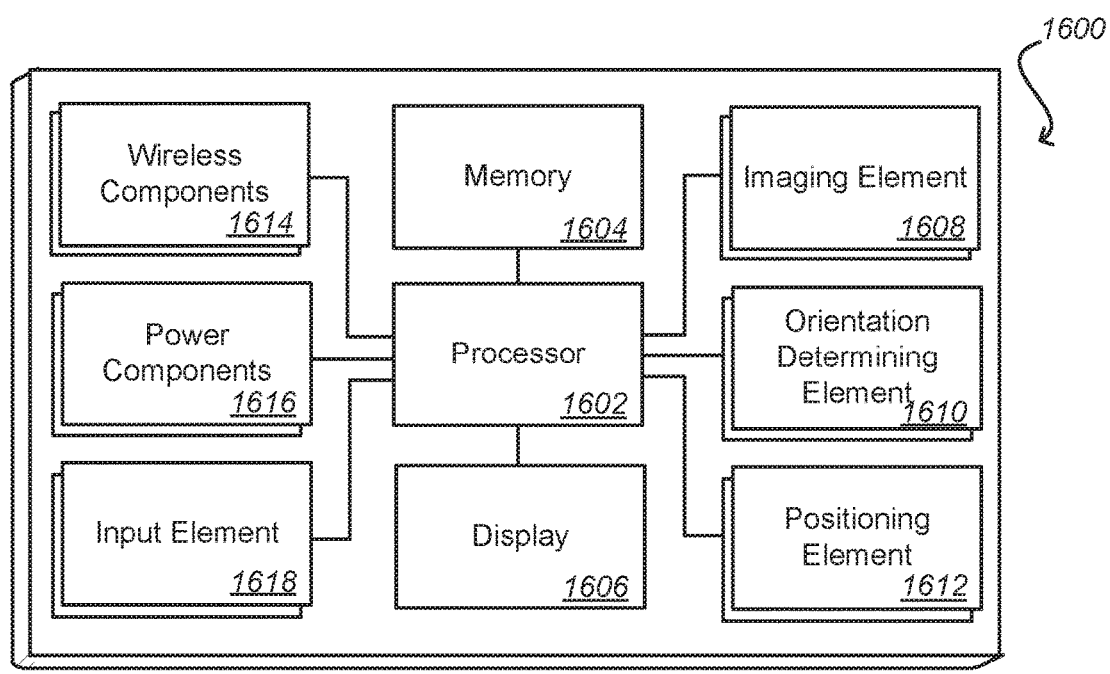
Figure 17:
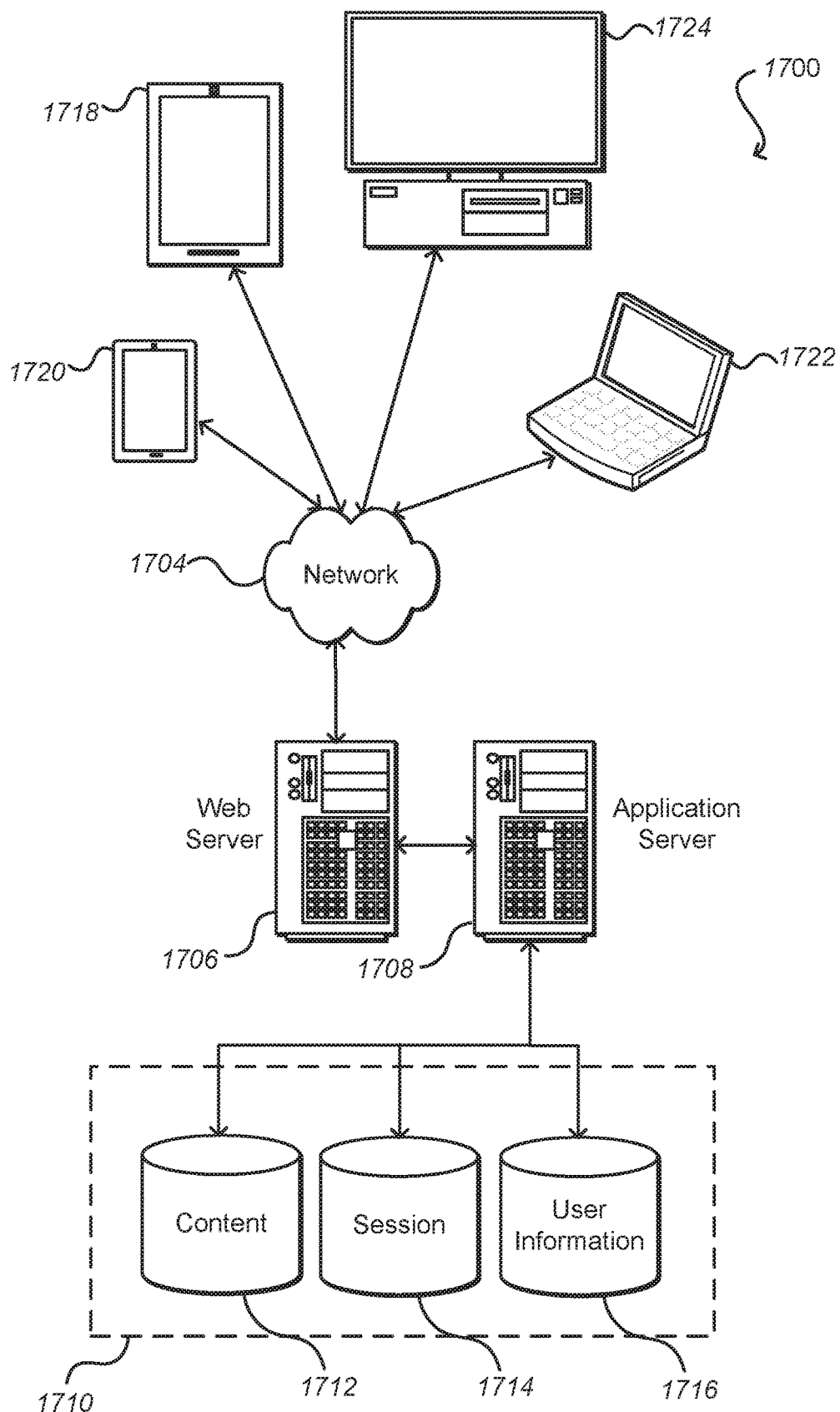
FIG. 17 illustrates an example computing environment that can be used to implement aspects of various embodiments.

FIGS. 15-17 illustrate a set of basic components of an example computing device 1500 that can be utilized to implement aspects of the various embodiments. In this example, the device 1500, 1600 includes at least one processor 1602 for executing instructions that can be stored in a memory device or element 1604. As would be apparent to one of ordinary skill in the art, the device can include many types of memory, data storage or computer-readable media, such as a first data storage for program instructions for execution by the at least one processor 1602, the same or separate storage can be used for images or data, a removable memory can be available for sharing information with other devices, and any number of communication approaches can be available for sharing with other devices. The device may include at least one type of display element 1502, such as a touch screen, electronic ink (e-ink), organic light emitting diode (OLED) or liquid crystal display (LCD), although devices such as servers might convey information via other means, such as through a system of lights and data transmissions. The device typically will include one or more networking components 508, such as a port, network interface card, or wireless transceiver that enables communication over at least one network. The device can include at least one input device 510 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The device 1500, 1600 can include one or more imaging elements 1510, 1608. One or more orientation determining elements 1610 can determine the orientation of the device, for example in relation to a user's face or eyes. Various camera-based and other sensors 1504, 1508, 1512, 1518 can be used to determine orientation. A positioning element 1612 can determine the position of the device. The positioning element 1612 can use one or more of GPS, local network detection, Bluetooth connection, or other protocols. One or more input elements 1610 can register user input, for example input received from a touch screen display. An example device 1500, 1600 will also include power components 1616 and wireless components 1614 to communicate with other devices wirelessly.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment 1700 includes at least one application server 1708 and a data store 1710. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1708 can include any appropriate hardware and software for integrating with the data store as needed to execute aspects of one or more applications for the client device and handling a majority of the data access and business logic for an application. The application server 1708 provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server 1706. It should be understood that the Web server 1706 and application servers 1708 are merely example components, as structured code discussed herein can be executed on any appropriate device or host machine as discussed elsewhere herein.

The data store 1710 can include several separate data tables, databases or other data storage mechanisms and media for storing data relating to a particular aspect. For example, the data store 1710 illustrated includes mechanisms for storing content 1712 (e.g., production data) and user information 1716, which can be used to serve content for the production side. The data store is also shown to include a mechanism for storing log or session data 1714. It should be understood that there can be many other aspects that may need to be stored in the data store, such as page image information and access rights information, which can be stored in any of the above listed mechanisms as appropriate or in additional mechanisms in the data store. The data store 1710 is operable, through logic associated therewith, to receive instructions from the application server and obtain, update or otherwise process data in response thereto. In one example, a user might submit a search request for a certain type of item. In this case, the data store 1710 might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server 1706, 1708 typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment 1700 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices 1718, 1720, 1722, 1724 which can be used to operate any of a number of applications. User or client devices 1718, 1720, 1722, 1724 can include any of a number of general purpose personal computers, such as desktop 1724 or laptop computers 1722 running a standard operating system, as well as cellular, wireless and handheld devices 1718, 1720 running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network 1704 that would be familiar to those skilled in the art for supporting communications using any of a variety of commercially-available protocols, such as TCP/IP, FTP, UPnP, NFS, and CIFS. The network 1704 can be, for example, a local area network, a wide-area network, a virtual private network, the Internet, an intranet, an extranet, a public switched telephone network, an infrared network, a wireless network and any combination thereof.

In embodiments utilizing a Web server 1706, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment 1700 can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method comprising:
   under the control of one or more computer systems configured with executable instructions,
   capturing a background image for each of a plurality of cameras, a background image portraying a background;
   capturing a plurality of object images, including at least one object image for each of the plurality of cameras, an object image portraying a viewpoint of an object against the background;
   creating a difference image by subtracting the background image of the viewpoint from the at least one object image of the viewpoint;
   determining high confidence pixels, the high confidence pixels being pixels that exceed a first threshold contrast with background image;
   determining low confidence pixels, the low confidence pixels being pixels that exceed a second threshold contrast with the background image, the second threshold contrast being lower than the first threshold contrast;
   determining pixels associated with the object, including high confidence pixels and a subset of low confidence pixels; and
   creating a plurality of segmentation masks corresponding to the plurality of object images, a segmentation mask including (i) filled space, comprising pixels associated with the object, and (ii) unfilled space, comprising pixels not associated with the object.

2. The computer-implemented method of claim 1, further comprising:
   determining object contours in the at least one object image, wherein the subset of low confidence pixels includes low confidence pixels that can be connected to a high confidence pixel without crossing an object contour;
   wherein determining high confidence pixels includes creating a high confidence image mask based at least in part on the difference image, the high confidence image mask indicating pixels that exceed the first threshold contrast with background image; and
   wherein determining low confidence pixels includes creating a low confidence image mask based at least in part on the difference image, the low confidence image mask indicating pixels that exceed the second threshold contrast with background image.

3. The computer-implemented method of claim 1, further comprising:
   creating an object mesh structure, based at least in part on the plurality of segmentations masks, the object mesh structure representing the object in three dimensions;
   receiving a request to display a representation of the object from a specified viewpoint;
   sending the object mesh structure, the plurality of segmentation masks, and the plurality of object images to a client device; and
   displaying the object image portraying the specified viewpoint overlaid on the object mesh structure oriented to the specified viewpoint.

4. The computer-implemented method of claim 3, further comprising:
   determining a ground plane intersecting the object mesh structure;
   determining a portion of the object mesh structure below the ground plane; and
   removing from the object mesh structure the portion of the object mesh structure below the ground plane.

5. The computer-implemented method of claim 3, further comprising:
   projecting the object mesh structure onto a segmentation mask of the plurality of segmentation masks; and
   refining the segmentation mask based at least in part on the projected object mesh structure.

6. A computer-implemented method comprising:
   under the control of one or more computer systems configured with executable instructions,
   determining an object image and background image, the background image including a background, the object image including an object in front of the background and representing a viewpoint of the object;
   determining high confidence pixels, the high confidence pixels being pixels that exceed a first threshold contrast with background image;
   determining low confidence pixels, the low confidence pixels being pixels that exceed a second threshold contrast with the background image, the second threshold contrast being lower than the first threshold contrast;
   determining pixels associated with the object, including high confidence pixels and a subset of low confidence pixels; and
   creating a segmentation mask based in part on the object image, the segmentation mask including (i) filled space, comprising pixels associated with the object, and (ii) unfilled space, comprising pixels not associated with the object.

7. The computer-implemented method of claim 6, further comprising:
   creating a plurality of segmentation masks from a respective plurality of viewpoints of the object;

creating an object mesh structure based at least in part on the plurality of segmentation masks, the object mesh structure representing the object in three dimensions;

receiving a request to display a three-dimensional representation of the object from a specified viewpoint; and displaying the object mesh structure from the specified viewpoint overlaid by the object image portraying the specified viewpoint.

8. The computer-implemented method of claim 7, further comprising
projecting the object mesh structure from a viewpoint to a segmentation mask associated with the viewpoint; and
refining the segmentation mask based at least in part on projecting the object mesh structure.

9. The computer-implemented method of claim 7, further comprising:
determining a ground plane intersecting the object mesh structure;
determining a portion of the object mesh structure below the ground plane; and
removing from the object mesh structure the portion of the object mesh structure below the ground plane.

10. The computer-implemented method of claim 6, further comprising:
determining object contours in the at least one object image, wherein the subset of low confidence pixels includes low confidence pixels that can be connected to a high confidence pixel without crossing an object contour;
wherein determining high confidence pixels includes creating a high confidence image mask based at least in part on subtracting the background image from the object image, the high confidence image mask indicating pixels that exceed the first threshold contrast with background image; and
wherein determining low confidence pixels includes creating a low confidence image mask based at least in part on subtracting the background image from the object image, the low confidence image mask indicating pixels that exceed the second threshold contrast with background image.

11. The computer-implemented method of claim 10, wherein determining object contours of the object comprises:
creating an edge map using an edge detection algorithm, the edge map including one or more gaps;
using a close morphological operation to close the gaps in the edge map;
traversing the edge map from an image boundary;
determining that edge pixels first encountered when traversing the edge map from an image boundary are contour pixels; and
determining object contours based at least in part on determining contour pixels.

12. A system comprising:
at least one processor;
memory including instructions that, when executed by the at least one processor, cause the system to:
determine a background image, the background image including a background;
determine an object image, the object image including an object in front of the background and representing a viewpoint of the object;
determining high confidence pixels, the high confidence pixels being pixels that exceed a first threshold contrast with background image;

determining low confidence pixels, the low confidence pixels being pixels that exceed a second threshold contrast with the background image, the second threshold contrast being lower than the first threshold contrast;
determining pixels associated with the object, including high confidence pixels and a subset of low confidence pixels; and
create a segmentation mask based in part on the object image, the segmentation mask including (i) filled space, comprising pixels associated with the object, and (ii) unfilled space, comprising pixels not associated with the object.

13. The system of claim 12, wherein the memory further includes instructions that, when executed by the at least one processor, cause the system to:
create a plurality of segmentation masks from a respective plurality of viewpoints of the object; and
create an object mesh structure based at least in part on the plurality of segmentation masks, the object mesh structure representing the object in three dimensions;
receive a request to display a three-dimensional representation of the object from a specified viewpoint; and
display the object mesh structure from the specified viewpoint overlaid by the object image portraying the specified viewpoint.

14. The system of claim 13, wherein the memory further includes instructions that, when executed by the at least one processor, cause the system to:
determine object contours in the at least one object image, wherein the subset of low confidence pixels includes low confidence pixels that can be connected to a high confidence pixel without crossing an object contour;
wherein determining high confidence pixels includes creating a high confidence image mask based at least in part on subtracting the background image from the object image, the high confidence image mask indicating pixels that exceed the first threshold contrast with background image; and
wherein determining low confidence pixels includes creating a low confidence image mask based at least in part on subtracting the background image from the object image, the low confidence image mask indicating pixels that exceed the second threshold contrast with background image.

15. The system of claim 13, wherein creating the object mesh structure comprises:
determining a three-dimensional object environment; and
subtracting the unfilled space of each segmentation mask from the three-dimensional object environment.

16. The system of claim 14, wherein determining object contours of the object comprises:
creating an edge map using an edge detection algorithm, the edge map including one or more gaps;
using a close morphological operation to close the gaps in the edge map;
traversing the edge map from an image boundary;
determining that edge pixels first encountered when traversing the edge map from an image boundary are contour pixels; and
determining object contours based at least in part on determining contour pixels.

17. The system of claim 13, wherein the memory further includes instructions that, when executed by the at least one processor, cause the system to:
project the object mesh structure from a viewpoint to a segmentation mask associated with the viewpoint; and refine the segmentation mask based at least in part on projecting the object mesh structure.

18. The system of claim 13, wherein the memory further includes instructions that, when executed by the at least one processor, cause the system to:
 determine a ground plane intersecting the object mesh structure;
 determine a portion of the object mesh structure below the ground plane; and
 remove from the object mesh structure the portion of the object mesh structure below the ground plane.

19. The system of claim 13, wherein the object mesh structure can be rotated to be viewed from each of the plurality of viewpoints, and wherein the object mesh structure is overlaid by the object image corresponding to the viewpoint from which the object mesh structure is viewed.

20. The system of claim 13, wherein displaying the object mesh structure comprises:
 capturing an actual client device environment through an image capture element of a client device; and
 displaying the object mesh structure overlaying the actual client device environment.

* * * * *